United States Patent [19]
Baldwin et al.

[11] Patent Number: 5,359,247
[45] Date of Patent: Oct. 25, 1994

[54] COOLING ARRANGEMENT AND METHOD FOR OFFSET GEARBOX

[75] Inventors: Jeffrey D. Baldwin, Rockford, Ill.; Ellen J. Wagle, Indianapolis, Ind.; Jude C. T. Lai, Rockford, Ill.

[73] Assignee: Sundstrand Corporation, Rockford, Ill.

[21] Appl. No.: 874,786

[22] Filed: Apr. 27, 1992

[51] Int. Cl.$^5$ .................. H02K 9/19; F01M 5/00
[52] U.S. Cl. .................. 310/54; 310/59; 184/6.22; 184/104.1
[58] Field of Search .................. 310/52, 54, 58, 59, 310/64, 112, 113; 322/33, 34; 184/6.22, 104.1; 244/60

[56] References Cited

U.S. PATENT DOCUMENTS

| | | | |
|---|---|---|---|
| 1,290,638 | 1/1919 | Morgan | 310/54 |
| 1,536,499 | 5/1925 | Horvath | 184/104.1 |
| 1,776,726 | 9/1930 | Gross | 184/104.1 |
| 3,870,907 | 3/1975 | Hoffman | 310/64 |
| 4,284,913 | 8/1981 | Barnhardt | 310/54 |
| 4,447,737 | 5/1984 | Cronin | 310/114 |
| 4,713,982 | 12/1987 | Fluegel et al. | 74/686 |
| 4,780,061 | 10/1988 | Butterworth | 184/6.22 |
| 4,787,271 | 11/1988 | Brogdon | 184/6.12 |
| 4,844,202 | 7/1989 | Maresko | 184/6.12 |
| 4,987,953 | 1/1991 | Hedstrom | 310/54 |
| 5,072,145 | 12/1991 | Davis et al. | 310/54 |
| 5,152,141 | 10/1992 | Rumford et al. | 60/39.02 |
| 5,177,951 | 1/1993 | Butler | 60/39.02 |

FOREIGN PATENT DOCUMENTS

| | | | |
|---|---|---|---|
| 2336969 | 2/1975 | Fed. Rep. of Germany | 184/6.22 |
| 0211607 | 8/1989 | Japan | 184/104.1 |
| 1590573 | 9/1990 | U.S.S.R. | 184/6.22 |

Primary Examiner—R. Skudy
Assistant Examiner—C. LaBalle
Attorney, Agent, or Firm—Antonelli, Terry, Stout & Kraus

[57] ABSTRACT

An offset gearbox of an aircraft has a sump for a lubricant. A heat exchanger core extends through the sump in contact with the lubricant. A fluid coolant for cooling an accessory such as an electrical power generating unit drivingly connected to the offset gearbox is circulated through the core in thermal communication but not mixed with the lubricant of the offset gearbox for cooling the lubricant. The cooling arrangement for the offset gearbox advantageously does not require a separate or dedicated heat exchanger which reduces system weight and cost. The single pump of the accessory can also be used for circulating the coolant. Increased reliability, independent oil change for maintenance and enhanced attitude performance are attained as gearbox performance does not affect power generating unit performance, and visa versa. An existing aircraft can be modified to include the offset gearbox with a minimum of modification and little additional weight and plumbing.

12 Claims, 2 Drawing Sheets

COOLING ARRANGEMENT AND METHOD FOR OFFSET GEARBOX

TECHNICAL FIELD

The present invention is directed to a cooling arrangement for a device which requires both cooling and lubrication, and more particularly, to a cooling arrangement for an offset gearbox and an accessory drivingly connected thereto in an aircraft.

BACKGROUND ART

Offset gearboxes can be used in aircraft, as for adapting electrical power generating equipment or other accessories to the existing aircraft engines in a retrofit. Installed length, angular orientation and input speed of the accessory such as the electrical power generating equipment can be optimized by use of and offset gearbox. Offset gearboxes normally contain a lubricant, typically oil, for lubrication of the gears therein. Internal gearbox heat, created by bearings, gear meshes and pump(s) of the gearbox, must be dissipated to maintain acceptable oil operating temperatures within the gearbox. A cooling arrangement for an offset gearbox must be cost effective and not add undue weight to the aircraft.

A typical cooling circuit for an electrical power generating unit (without an offset gearbox) is shown in FIG. 1. As indicated therein, the electrical power generating unit 1, which may be an integrated drive-generator system, is drivingly connected to engine gearbox 2. A fuel/air heat exchanger 3 external to the unit 1 cools oil circulated through the heat exchanger from an oil outlet of the unit 1 by way of oil line 5. The cooled oil is returned to an oil inlet of the unit 1 by oil line 4.

A cooling arrangement for an integrated drive generator system is disclosed in U.S. Pat. No. 4,284,913. In the disclosed system of the patent, a drive unit and a generator unit of the system share a common lubricant-coolant fluid system. This system does not include an offset gearbox. See also U.S. Pat. Nos. 4,787,271; 4,844,202 and 4,447,737.

DISCLOSURE OF INVENTION

An object of the present invention is to provide a cooling arrangement for a device, particularly an offset gearbox in an aircraft which requires both cooling and lubrication, the cooling arrangement overcoming the aforementioned problems and disadvantages in the prior art.

An additional object of the invention is to provide a cooling arrangement of the aforementioned type wherein the gearbox internal lubricant can be kept separate from the coolant of the electrical power generating component or other accessory. It is also an object of the invention to provide an aircraft having a reliable cooling arrangement which is cost effective and adds very little additional weight to an aircraft.

These and other objects of the invention are attained by the cooling arrangement of the invention for a device which requires both cooling and lubrication. The cooling arrangement comprises a first device with a lubricant therein for lubricating the first device, a second device, a fluid coolant for cooling the second device, and means for circulating the fluid coolant for cooling the second device in thermal communication with but not mixed with the lubricant of the first device for cooling the lubricant and thereby the first device. In the disclosed embodiment, the first device is an offset gearbox adapted to be driven by an aircraft engine through an aircraft engine gearbox. The accessory, which can be an electrical power generating unit, is drivingly connected to the offset gearbox.

The means for circulating the fluid coolant includes a core located in a sump of the offset gearbox. The core has a passage therein through which the coolant is circulated. Heat is transferred through the core from the lubricant in the sump to the coolant circulated through the core passage. In the disclosed embodiment both the gearbox lubricant and the coolant for the first and second devices, is oil. Since the gearbox internal oil is kept separate from the cooling oil of the electrical power generating component, increased reliability can be attained. The cooling arrangement also allows independent oil change as required for maintenance. Attitude performance (roll, climb, dive) is also enhanced as the working media of the devices are kept separate, e.g. gearbox performance does not affect power generating unit performance and vice-versa. Further, the offset gearbox does not require a separate or dedicated heat exchanger which reduces system weight and cost. In addition, the cooling arrangement of the invention involves very little additional weight and plumbing. Modification of an existing installation to include the cooling arrangement of the invention is also held to a minimum, as in a retrofit.

Another feature of the invention is that the core in the sump of the offset gearbox is formed integrally with a wall of sump, e.g. the bottom wall. Alternatively, the core can be separately formed and supported within the sump with support ribs. One or more fins may be added to the core to enhance heat exchange between the two fluids.

A method according to the invention for cooling an offset gearbox and an accessory such as an electrical power generating unit drivingly connected to the offset gearbox and having a passage for flowing a coolant therethrough, comprises the steps of providing the offset gearbox with a sump which contains a lubricant for lubricating and cooling the gearbox and a heat exchanger core extending in contact with the lubricant, the core having a passage therein for flowing a coolant, and circulating a coolant through both the accessory and the coolant passage of the core in the sump of the offset gearbox in thermal communication with but not mixed with the lubricant of the offset gearbox for cooling the lubricant.

These and other objects, features and advantages of the present invention will become more apparent from the following description when taken in connection with the accompanying drawings, which show, for the purpose of illustration only, several embodiments in accordance the present invention.

BEST MODE FOR CARRYING OUT THE INVENTION

Figure 2:
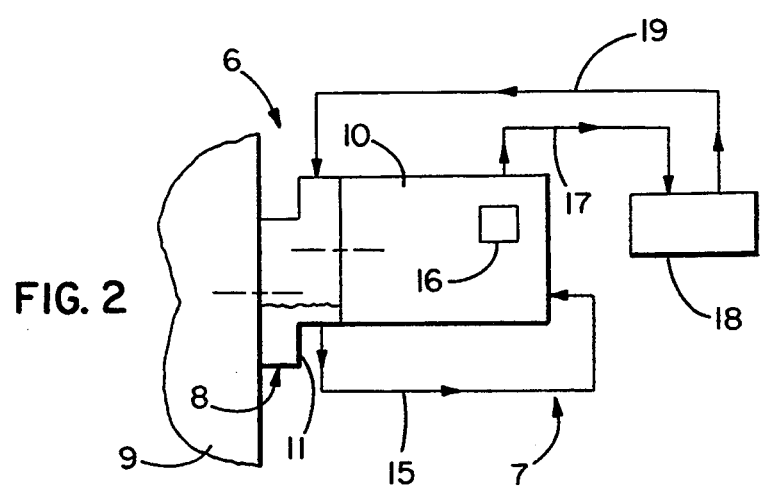
FIG. 2 is a schematic illustration of a cooling arrangement according to the invention for cooling an offset gearbox and an electrical power generating unit of an aircraft.
Figure 3:
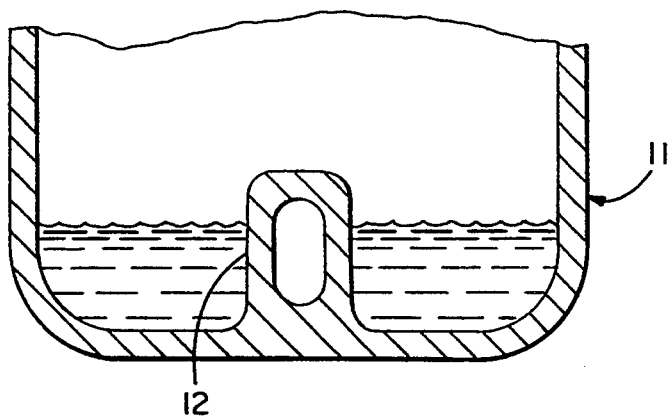
FIG. 3 is a cross-sectional view through a lower portion of the offset gearbox of FIG. 2 depicting an oil sump of the gearbox and an heat exchanger core or tube in the sump through which a coolant is circulated.
Figure 4:
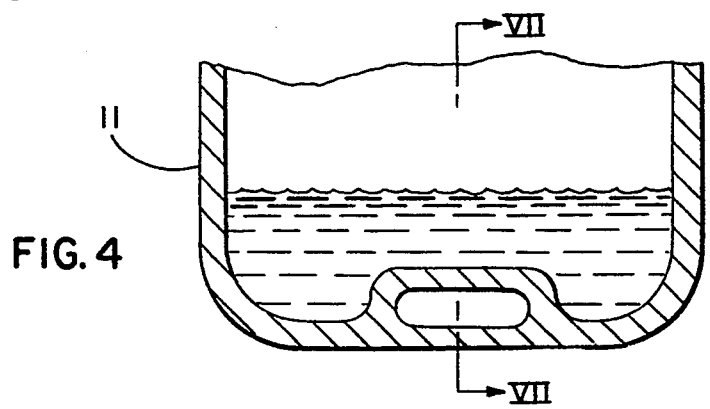
FIG. 4 is a cross-sectional view similar to FIG. 3 but showing another form of the core through the sump.

Referring now to the drawings, particularly FIGS. 2-7, a portion of an aircraft 6 schematically illustrated in FIG. 2 is seen to comprise a cooling arrangement 7 of the invention for an offset gearbox 8. The offset gearbox 8 is drivingly connected between an aircraft engine gearbox 9 and an electrical power generating unit 10 for transmitting the rotary motion from the engine gearbox to the unit 10 to generate electrical power for the aircraft 6.

The offset gearbox 8 contains oil which is used for cooling and lubrication. The lower portion of the offset gearbox constitutes a sump 11 for this oil. Heat generated by the internal gears and bearings of the offset gearbox is rejected into the sump oil. To cool this oil, according to the invention cooling oil for the unit 10 is routed through a core 12 located in the sump of the offset gearbox. Heat is transferred from the oil in the offset gearbox, through the core wall, and into the oil moving through the core without mixture of the respective oils.

Figure 7:
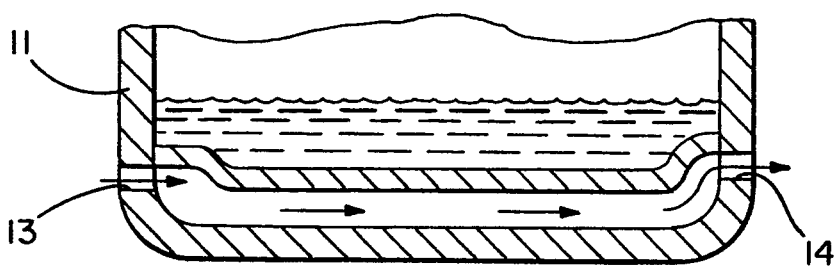
FIG. 7 is a cross-sectional view of the sump of the offset gearbox of FIG. 4 taken along the line VII—VII in FIG. 4.

The oil coolant flows through the core 12 of the offset gearbox 8 from an oil inlet 13 to and oil outlet 14, see FIG. 7, and is then circulated to the generator unit 10 by way of oil line 15 as illustrated in FIG. 2. The oil then flows through the unit 10 for cooling and lubrication of the unit 10. A pump 16 shown schematically in FIG. 2 is included within the unit 10 for circulating the oil in the closed loop depicted in FIG. 2. After circulation through the unit 10, the oil is conveyed by way of an oil line 17 to a fuel/air heat exchanger 18 of the aircraft where the oil is cooled and recirculated via oil line 19 to the oil inlet 13 of the offset gearbox.

Figure 1:
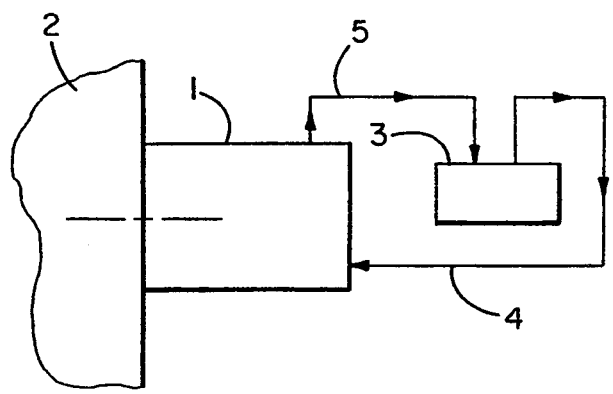
FIG. 1 is a schematic illustration of a prior art, cooling arrangement for an electric power generating unit of an aircraft.

The modifications to the prior art cooling arrangement of FIG. 1 by the addition of an offset gearbox and a cooling arrangement according to the present invention require only the addition of the one oil line 15 between the offset gearbox 8 and the generating unit and the rerouting of the existing aircraft oil lines. The internal coring in the offset gearbox 8 can be formed integrally with a wall of the sump as shown in FIGS. 3, 4, 6 and 7, where the core is formed integrally with the bottom wall of the sump. Both the sump and core can be formed of cast aluminum or other metal. The wall thickness of the core can be 3/16ths—¼ inch, for example. The flow rate of the oil through the core of the gearbox and the generating unit is, illustratively 12-14 gpm with the oil being under a pressure of 200-400 psi. The offset gearbox 8 can include a one or two mesh power train. A single or double mesh offset gearbox is preferable since it has low heat generation. The disclosed cooling arrangement can meet the cooling requirements of the generator unit, which are typically greater than that of the offset gearbox, as well as those of the offset gearbox.

Figure 5:
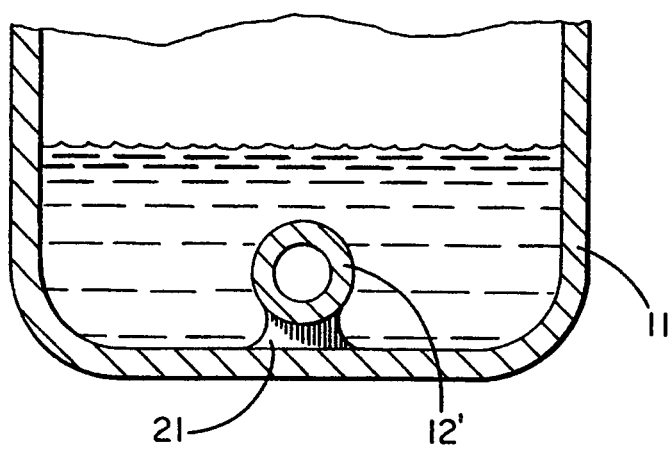
FIG. 5 is a cross-sectional view similar to FIG. 3 except that it depicts a further possible variation of the heat exchanger core in the sump.
Figure 6:
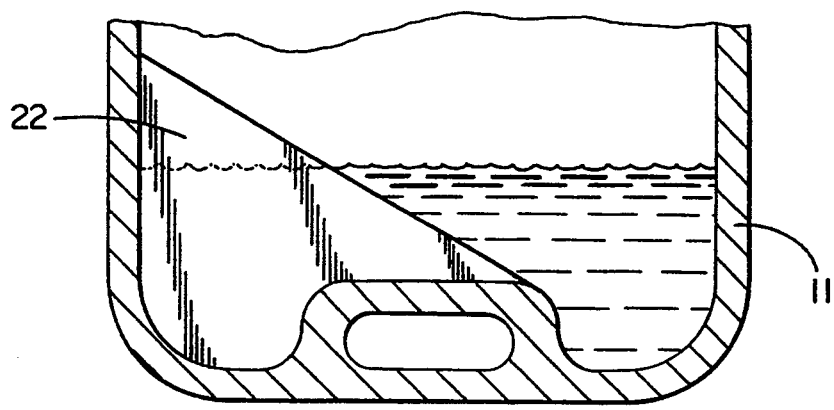
FIG. 6 is a cross-sectional view similar to FIG. 4 illustrating a fin added to the heat exchanger core to increase the cooling surface area of the core.

The core 12' in FIG. 5 is a tube suspended above the bottom of the sump by spaced supporting ribs 21 connected to both the tube and sump. Proper sizing of core length, cross-section and core surface area in the offset gearbox and also the coolant flow rate provide adequate cooling capacity to maintain acceptable oil operating temperature. Oil-in and oil-out bosses, not shown, are provided on the offset gearbox and generating unit to transfer the cooling oil to and from the external circuit. The cooling surface area of the core can be enhanced by adding fins 22 as shown in FIG. 6, if required.

The cooling arrangement of the invention offers the following advantages. Gearbox internal oil is kept separate from the cooling oil of the electrical power generating component. This leads to increased reliability and allows independent oil change as required per maintenance. Attitude performance (roll, climb, dive) is enhanced as the working media of each device are kept separate so that gearbox performance does not affect power generating unit performance, and vice-versa. A separate or dedicated heat exchanger is not required for the offset gearbox which reduces the system weight and cost. The proposed cooling scheme involves very little additional weight and plumbing. The modification of an existing installation to include an offset gearbox with the cooling arrangement of the invention, is held to a minimum.

While we have shown and described only several embodiments in accordance with the present invention, it is understood that the same is not limited thereto, but is susceptible to numerous changes and modifications as known to those skilled in the art. Therefore, we do not wish to be limited to the details shown and described herein, but intend to cover all such changes and modifications as are encompassed by the scope of the appended claims.

We claim:

1. A cooling arrangement for an offset gearbox and an electrical power generating unit drivingly connected thereto in an aircraft, comprising an offset gearbox drivingly connected to an engine gearbox, said offset gearbox having a sump with a fluid lubricant therein for lubricating the offset gearbox, an electrical power generating unit drivingly connected to said offset gearbox, fluid coolant for cooling both the lubricant of the offset gearbox and the electrical power generating unit, and means for circulating the fluid coolant through both the electrical power generating unit, for cooling the unit, and in thermal communication with but not mixed with the lubricant of the offset gearbox for cooling the lubricant of the offset gearbox.

2. A cooling arrangement according to claim 1, wherein said means for circulating the fluid coolant includes a passage in the form of an essentially closed loop through which the fluid coolant circulates, said passage extending sequentially through the offset gearbox core, the electrical power generating unit and heat exchanger means for cooling the fluid coolant.

3. A cooling arrangement according to claim 2, wherein said electrical power generating unit includes a pump for circulating the fluid coolant in said essentially closed loop.

4. A cooling arrangement according to claim 1, wherein said fluid coolant is a lubricant which both cools and lubricates said electrical power generating unit as well as cools the lubricant of the offset gearbox.

5. A cooling arrangement according to claim 1, wherein said means for circulating the fluid coolant includes a core located in the sump of said offset gearbox, said core having a passage therein through which the coolant is circulated, and wherein heat is transferred through the core form the lubricant in said sump to the coolant circulated through the core passage.

6. A cooling arrangement according to claim 5, wherein said core is formed integrally with a wall of said offset gearbox device which forms said sump.

7. A cooling arrangement according to claim 6, wherein said core is formed integrally with a bottom wall of the sump.

8. A cooling arrangement according to claim 5, wherein said core is the form of a tube which is supported above a bottom of the sump by support ribs.

9. A cooling arrangement according to claim 5, wherein said core includes at least one fin connected to its outer surface and extending in the lubricant in the sump to enhance heat exchange between the lubricant and the coolant.

10. A cooling arrangement according to claim 1 wherein said means for circulating the fluid coolant includes a heat exchanger external to said offset gearbox and said electrical power generating unit for removing heat from the circulating coolant.

11. A cooling arrangement according to claim 1, wherein said means for circulating includes a pump for circulating said coolant.

12. A method of cooling an offset gearbox, for an aircraft engine gearbox, and an electrical power generating unit drivingly connected to the offset gearbox comprising providing the offset gearbox with a sump which contains a lubricant for lubricating the offset gearbox and a heat exchanger core in contact with the lubricant in the sump, said core having a passage therethrough for flowing a coolant, and circulating a coolant for the electrical power generating unit drivingly connected to the offset gearbox, and having a passage for flowing a coolant therethrough, through the coolant passage of the core without mixing the coolant with the lubricant of the offset gearbox.

* * * * *